US006584454B1

(12) United States Patent
Hummel, Jr. et al.

(10) Patent No.: US 6,584,454 B1
(45) Date of Patent: Jun. 24, 2003

(54) METHOD AND APPARATUS FOR COMMUNITY MANAGEMENT IN REMOTE SYSTEM SERVICING

(75) Inventors: Henry John Hummel, Jr., Waukesha, WI (US); Karamjeet Singh, Germantown, WI (US); Thomas L. Lamoureux, Waukesha, WI (US); Hubert A. Zettel, Waukesha, WI (US); Michael E. Kelly, Hartland, WI (US); Lawrence E. Ploetz, Brookfield, WI (US); David T. Mehring, Sussex, WI (US); Sunil Melepatt Palliyal, Waukesha, WI (US)

(73) Assignee: GE Medical Technology Services, Inc., Waukesha, WI (US)

( * ) Notice: Subject to any disclaimer, the term of this patent is extended or adjusted under 35 U.S.C. 154(b) by 0 days.

(21) Appl. No.: 09/477,041

(22) Filed: Dec. 31, 1999

(51) Int. Cl.[7] .................................................. A06F 17/60
(52) U.S. Cl. ............................................ 705/59; 705/1
(58) Field of Search ........................................... 705/59

(56) References Cited

U.S. PATENT DOCUMENTS

| | | | | |
|---|---|---|---|---|
| 5,867,821 A | * | 2/1999 | Ballantyne et al. | 345/970.1 |
| 5,872,915 A | * | 2/1999 | Dykes et al. | 713/202 |
| 5,987,232 A | * | 11/1999 | Tabuki | 709/229 |
| 6,061,796 A | * | 5/2000 | Chen et al. | 380/283 |
| 6,094,721 A | * | 7/2000 | Eldridge et al. | 235/382.5 |
| 6,226,752 B1 | * | 5/2001 | Gupta et al. | 713/200 |
| 6,338,064 B1 | * | 1/2002 | Ault et al. | 707/10 |

FOREIGN PATENT DOCUMENTS

JP        10079732 A     *    3/1998      ............. H04L/9/32

OTHER PUBLICATIONS

M2 Presswire; MIS Europe : Total systems security from MIS Europe, Nov. 21, 1996.*

* cited by examiner

Primary Examiner—James P. Trammell
Assistant Examiner—John M. Winter
(74) Attorney, Agent, or Firm—Ostranger Chong & Flaherty LLP

(57) ABSTRACT

A method and a system for delivery of protected software applications to remote systems from a central service facility wherein delivery is managed on the basis of the community membership of the remote system user. Business rules are utilized to determine whether a particular authenticated user seeking access to a protected software application from a particular remote site should be authorized. A multiplicity of web servers are programmed to allow selective access to one or more resident software applications by remote system users via a network. Access is managed by a central policy server based on user and system information and community definitions stored in a database. The policy server communicates with each web server via an agency module incorporated in the web server. The agency module intercepts requests for access from remote system users and then interfaces with the policy server. If the remote system user has input an authentic identification code, the policy server then applies the business rules to determine whether the requesting remote system user is authorized to access the protected software being requested.

27 Claims, 7 Drawing Sheets

COMMUNITY MANAGEMENT

METHOD AND APPARATUS FOR COMMUNITY MANAGEMENT IN REMOTE SYSTEM SERVICING

FIELD OF THE INVENTION

This invention relates generally to software protection and license monitoring of application software and information files for remote applications.

BACKGROUND OF THE INVENTION

One example of a remote application is remote monitoring and diagnosing of equipment or systems. Currently, many companies are developing capabilities for remote monitoring and diagnosing of equipment or systems. The remote equipment or systems (hereinafter referred to as remote systems) span the gamut from industrial steam turbines to networked printers, from medical imaging equipment to home appliances. In almost all cases, there is some computational capability resident on the remote systems, such as a processor. Generally, the processor performs functions such as data gathering, operation monitoring, executing diagnostic applications, and providing the end-user or customer access to information and applications on the remote systems.

In a typical remote monitoring application, software and other information files resident on a remote system are out of the direct control of the vendor because they reside in the customer's environment. But some of the software applications and information files within that processing environment are highly sensitive and need to be protected from tampering (e.g., inadvertent modification and malicious vandalism). Tampering with software applications or information files, such as configuration files that are resident on the remote system, may prevent a user from having access to a needed functionality. Alternatively, tampering could allow a user to access to a restricted functionality. It is even possible that tampering could lead to equipment failure.

Therefore, systems for protecting software applications and configuration information files that are resident on a remote system from tampering are known. One known system uses mechanisms for ensuring that files are not accessible to a customer that has not paid for them and whose access has been terminated. These mechanisms also ensure that diagnostic utilities are not accessible to non-vendor service providers that may service the remote system.

Typically authorized field engineers make service calls to the remote sites for the purpose of servicing the equipment at those sites. While in the field, the field engineer is able to communicate with a central service facility via a network using a field service unit. The field service unit may include a portable computer designed for use by field service engineers at remote sites. The unit includes a service platform which includes certain functional circuitry for establishing a uniform service base for the remote systems. Moreover, the service units include specific service tools which enable the field engineer to request and receive remote service messages, reports on specific diagnostic systems, service schedules, and so forth. Through the service platform, the field engineer may access system configurations, historic log information, system network information, analysis logs and data, and so forth. The field engineer may also update service records. Typically, the field service unit is programmed with an access module for allowing the service facility to verify the license and security status of the field service unit. For example, the access module, in cooperation with circuitry at the service facility, may permit a field service engineer to access data or applications providing some or all of the functionality offered to service engineers at the service facility. Such functionalities may be similar to those provided at the remote systems themselves, or may offer the service engineer a wider range of service options. In particular, the field service unit may be equipped with service applications, such as for analyzing diagnostic system performance data, scheduling regular or special service calls, scheduling for shipment of replacement parts, and so forth. Other applications may permit the field service engineer to address service requests from the remote system, and transmit service messages and updates via the field service unit. The field service units may comprise personal computers or laptop computers of any suitable processor platform.

Obviously, authorized field service engineers require access to different software applications than those accessed by other system users. In particular, the field service engineer requires access to proprietary and extremely sensitive software in the form of service tools, service documentation and service records to enable system problem-solving and proper servicing of equipment. It is in the business interest of the operator of the central service facility to limit access to proprietary and highly sensitive software to authorized individuals, i.e., persons having the required security clearance. Preferably, the security system would allow field service personnel and other authorized persons to access central software of a highly sensitive nature from the remote system being serviced, while preventing other authorized users who lack the necessary security clearance from accessing the same software.

Thus there is a need for a system for providing a wide variety of software applications to a wide variety of communities of remote system users on the basis of different levels of security. In the case where a business entity, such as a hospital, has a service contract with a vendor who provides on-site service and remote site access to software applications residing at a central facility, there is a need for a method of managing remote access to that software by users having different security classifications. The system should also be capable of providing different access rights to different persons having the same security clearance. For example, within each security level, users should be further distinguished based on different levels of authority and different job responsibilities (i.e., membership in different communities), which give rise to the need to access different software applications requiring a particular security level.

SUMMARY OF THE INVENTION

The invention is directed to a method and a system for delivery of protected software applications to remote systems from a central service facility wherein delivery is managed on the basis of the level of security clearance and on the basis of the community membership of the remote system user. A one-factor security scheme is utilized to determine whether remote system users seeking access to low-level protected software applications are authentic. Business rules are utilized to determine whether authenticated users seeking access should be authorized.

In accordance with the preferred embodiments of the invention, a multiplicity of web servers are programmed to allow selective access to one or more resident software applications by remote system users via a network. Some applications are open and others are protected, with preferably two levels of protection being enforced. Access is managed by a central policy server based on user and system information and community definitions stored in a database. The policy server communicates with each web server via an agency module incorporated in the web server.

The agency module intercepts requests for access from remote system users and interfaces with the policy server. The agency module determines whether the requested application is open or protected. If the requested software application is open, the agency module signals the web server to allow access. If the requested software application is protected, the agency module contacts the policy server. The policy server authenticates passwords, while referring the authentication of associated security codes to a security server. For low-level security software applications, if the password is authenticated, the policy server then applies the business rules to determine whether the requesting remote system user is authorized to access the protected software application. A particular individual may concurrently be a member of different communities.

In accordance with the preferred embodiment of the invention, different user authentication algorithms are employed depending on whether the user has a one-factor or a two-factor security clearance. Users having a one-factor security clearance are entitled to access software applications having a low-level of protection, while those with a two-factor security clearance are entitled to access both low-level and high-level protected software applications. Preferably, the particular remote system user sends a request to access a particular software application via a web browser at the remote system, the latter being connected via a network to the web server where the requested software application resides. If the user has a two-factor security clearance, during log-in he/she must input both factors, e.g., a password and a security code, in addition to a user identification. If the user has only a one-factor security clearance, then only that one factor (e.g., a password) and the user identification are input during log-in.

In either case, the agency module for the web server where the requested software resides intercepts the request for access and the logged-in user information, and then forwards them to the central policy server. Preferably, the distributed web servers are separated from the central policy server by a firewall. The transmitted information is processed by the policy server to determine whether the request for access should be approved. This processing involves two stages: (1) authentication of the user; and (2) authorization for access to the requested software application. The policy server authenticates the password by referring to an electronically accessible community management database. For access to low-level security software applications, if the password is authentic, the policy server then proceeds to determine whether access should be authorized based on user, site, system, contract and other information and business rules (i.e., community definitions) in the community management database. The business rules apply certain criteria to determine whether the particular community which the user belongs to is authorized to access the protected software applications being requested.

DETAILED DESCRIPTION OF THE PREFERRED EMBODIMENTS

The following detailed description of the preferred embodiment of the invention is presented in the context of a central facility for servicing a multiplicity of remotely located medical diagnostic systems and workstations via a network. However, it should be appreciated that the invention has application in any system where remote systems utilize licensed software and/or database files and are connected to a central facility via a network.

Figure 1:
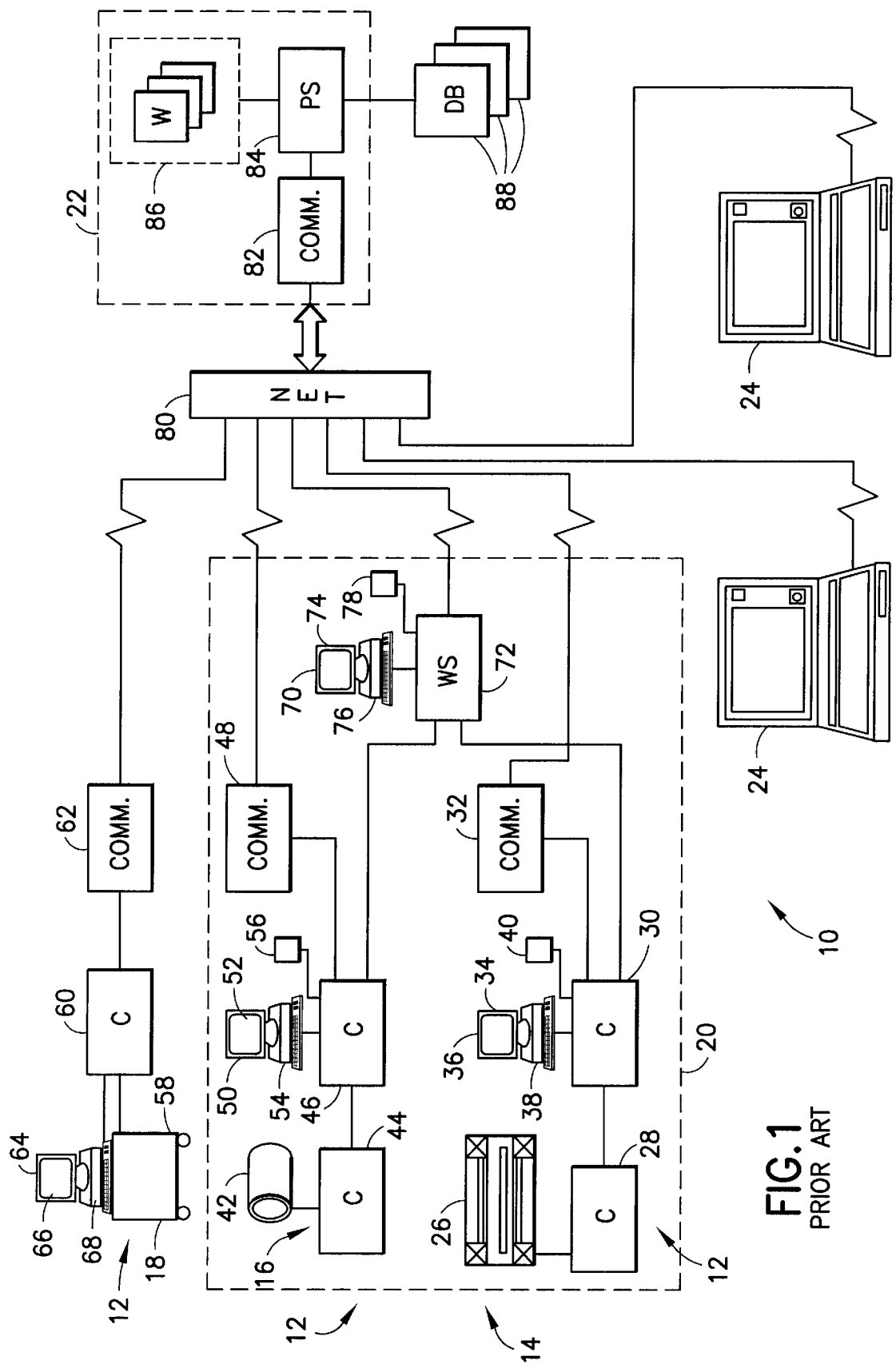
FIG. 1 is a diagrammatical representation of a series of medical diagnostic systems coupled to a service facility via a network connection for providing centralized service and data interchange between the diagnostic systems and the service facility.

Referring to FIG. 1, a prior art service system 10 is illustrated for providing centralized service to a plurality of remotely located medical diagnostic systems 12. In the embodiment shown in FIG. 1, the medical diagnostic systems include a magnetic resonance imaging (MRI) system 14, a computerized tomography (CT) system 16, and an ultrasound imaging system 18. The diagnostic systems may be positioned in a single location or facility, such as a medical facility 20, or may be remote from one another as shown in the case of ultrasound system 18. The diagnostic systems are serviced from a centralized service facility 22. Moreover, a plurality of field service units 24 may be coupled in the service, system for transmitting service requests, verifying service status, transmitting service data etc. as described more fully below.

Depending upon the modality of the systems, various subcomponents or subsystems will be included. In the case of MRI system 14, such systems will generally include a scanner 26 for generating pulsed magnetic fields and for collecting signals from emissions by gyromagnetic material within a subject of interest. The scanner is coupled to a control and signal detection circuit 28 which, in turn, is coupled to a system controller 30. System controller 30 includes a uniform platform for interactively exchanging service requests, messages and data with service facility 22 as described more fully below. System controller 30 is linked to a communications module 32, which may be included in a single or separate physical package from system controller 30. System controller 30 is also linked to an operator station 34, which will typically include a computer monitor 36, a keyboard 38, as well as other input devices 40, such as a mouse. In a typical system, additional components may be included in system 14, such as a printer or photographic system for producing reconstructed images based upon data collected from scanner 14.

Similarly, CT system 16 will typically include a scanner 42 which detects portions of x-ray radiation directed through a subject of interest. Scanner 42 is coupled to a generator and controller, as well as to a signal acquisition unit, represented collectively at reference numeral 44, for controlling operation of an x-ray source and gantry within scanner 42, and for receiving signals produced by a detector array moveable within the scanner. The circuitry within the controller and signal acquisition components is coupled to a system controller 46 which, like controller 30 mentioned above, includes circuitry for commanding operation of the scanner and for processing and reconstructing image data based upon the acquired signals. System controller 46 is linked to a communications module 48, generally similar to communications module 32 of MRI system 14, for transmitting and receiving data for central service of system 16. Also, system controller 46 is coupled to an operator station 50 which includes a computer monitor 52, a keyboard 54, as well as other input devices 56, such as a mouse. Moreover, like MRI system 14, CT system 16 will generally include a printer or similar device for outputting reconstructed images based upon data collected by scanner 42.

Other modality devices will include circuitry and hardware particularly configured for acquiring or producing signals in accordance with their particular design. In particular, ultrasound imaging system 18 will generally include a scanner and data processing unit 58 for transmitting ultrasound signals into a subject of interest, and for acquiring resultant signals which are processed for reconstructing a useful image. The system includes a system controller 60 which regulates operation of scanner 58 and which processes acquired signals to reconstruct the image. Moreover, system 18 includes a communications module 62 for transmitting service requests, messages and data between system controller 60 and service facility 22. System 18 also includes an operator station 64, including a monitor 66, as well as input devices such as a keyboard 68.

Where more than one medical diagnostic system is provided in a single facility or location, as indicated in the case of MRI and CT systems 14 and 16 in FIG. 1, these may be coupled to a management station 70, such as in a radiology department of a hospital or clinic. The management station may be linked directly to controllers for the various diagnostic systems, such as controllers 30 and 46 in the illustrated example. The management system may include a computer workstation or personal computer 72 coupled to the system controllers in an intranet configuration, a file-sharing configuration, a client/server arrangement, or any other suitable arrangement. Management station 70 will typically include a monitor 74 for viewing system operational parameters, analyzing system utilization, and exchanging service requests and data between the remote facility 20 and the central service facility 22. Input devices, such as a standard computer keyboard 76 and mouse 78, may also be provided to facilitate the user interface. It should be noted that, alternatively, the management system, or other diagnostic system components, may be stand-alone, i.e., not coupled directly to a diagnostic system. In such cases, the service platform described herein, and some or all of the service functionality may nevertheless be provided on the management system. Similarly, in certain applications, a diagnostic system may consist of a stand-alone or networked picture archiving communications and retrieval system or a viewing station provided with some or all of the functionality described herein.

The communication modules mentioned above, as well as workstation 72 and field service units 24, may be linked to service facility 22 via a remote access network 80. For this purpose, any suitable network connection may be employed. Preferred network configurations include both proprietary or dedicated networks, as well as open networks, such as the Internet. Data may be exchanged between the diagnostic systems, field service units 24, and central service facility 22 in any suitable format, such as in accordance with the Internet Protocol (IP), the Transmission Control Protocol (TCP), or other known protocols. Moreover, certain of the data may be transmitted or formatted via markup languages, such as the HyperText Markup Language (HTML), or other standard languages. The preferred interface structures and communications components are described in greater detail below.

Within service facility 22, messages, service requests and data are received by communication components as indicated generally at reference numeral 82. Components 82 transmit the service data to a service center processing system, represented generally at reference numeral 84 in FIG. 1. The processing system manages the receipt, handling and transmission of service data to and from the service facility. In general, processing system 84 may include one or a plurality of computers, as well as dedicated hardware or software servers for processing the various service requests and for receiving and transmitting the service data, as described more fully below. Service facility 22 also includes a bank of operator workstations 86, which may be staffed by service engineers who address the service requests and provide off- and on-line service to the diagnostic systems in response to the service requests. Also, processing system 84 may be linked to a system of databases or other processing systems 88 at or remote from the service facility 22. Such databases and processing systems may include extensive database information on operating parameters, service histories, etc., both for particular subscribing scanners and for extended populations of diagnostic equipment. As described below, such databases may be employed both for servicing of particular diagnostic systems and for tracking such servicing, as well as for deriving comparison data for use in servicing a particular system or a family of systems.

Figure 2:
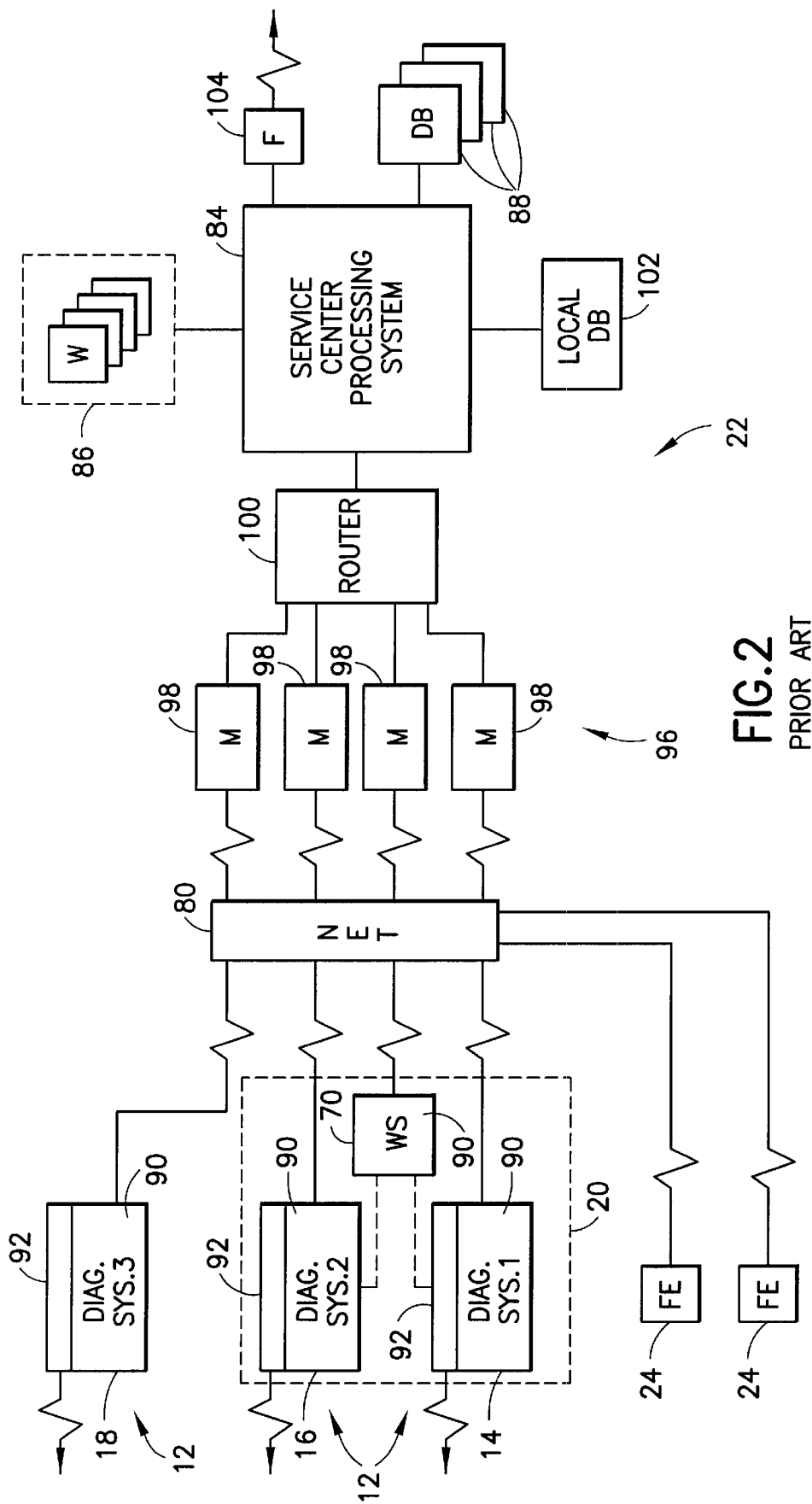
FIG. 2 is a block diagram of the systems shown in FIG. 1, illustrating certain functional components of the diagnostic systems and the service facility.

FIG. 2 is a block diagram illustrating the foregoing system components in a functional view. As shown in FIG. 2, remotely located field service units 24 and diagnostic systems 12 can be linked to the central service facility 22 via a network connection as illustrated generally at reference numeral 80. Within each diagnostic system 12, a uniform service platform 90 is provided. Platform 90 includes hardware, firmware, and software components adapted for composing and transmitting service requests and service task lists, transmitting and receiving service data, establishing network connections, and managing financial or subscriber arrangements between the diagnostic system and the service facility. Preferably, the platform 90 is integrated into the system controller of the diagnostic system. These platforms provide a uniform graphical user interface at each diagnostic system, which can be adapted to various system modalities to facilitate interaction of clinicians and radiologists with the various diagnostic systems for service functions. The platforms enable the scanner designer to interface directly with the control circuitry of the individual scanners, as well as with memory devices at the scanners, to access image, log and similar files needed for rendering requested or subscribed services. Where a management station 70 is provided, a similar uniform platform is preferably loaded on the management station to facilitate direct interfacing between the management station and the service facility. In addition to the uniform service platform 90, each diagnostic system is preferably provided with an alternative communications module 92, such as a facsimile transmission module for sending and receiving facsimile messages between the remotely located scanner and the central service facility.

Messages and data transmitted between the diagnostic systems and the service facility traverse a security barrier or "firewall" contained within processing system 84, which prevents unauthorized access to the service facility in a manner generally known in the art. A modem rack 96, including a series of modems 98, receives the incoming data, and transmits outgoing data through a router 100, which manages data traffic between the modems and the service center processing system 84.

As mentioned above, processing system 84 receives and processes the service requests and data, and interfaces with additional service components, both at the service facility and remote from the facility. As shown in FIG. 2, operator workstations 86 are coupled to the processing system, as are remote databases or computers 88. In addition, at least one local service database 102 is provided for verifying license and contract arrangements, storing service record files, log files, etc. Moreover, one or more communication modules 104 are linked to processing system 84 to send and receive facsimile transmissions between the service facility and the diagnostic systems or field service units.

Figure 3:
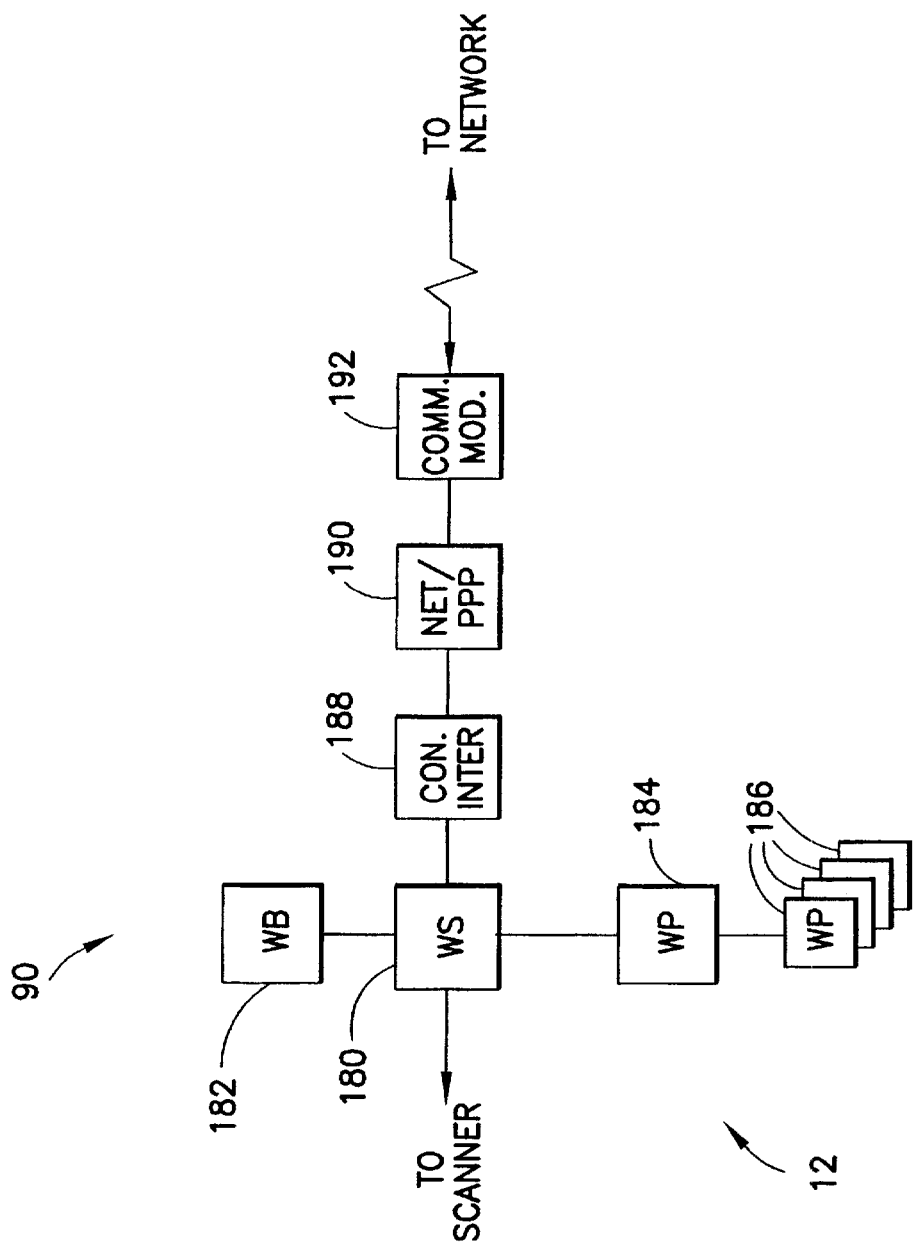
FIG. 3 is a block diagram showing the functional components of a uniform service platform suitable for use in a remote system.

FIG. 3 shows the various functional components comprising the uniform service platform 90 within each diagnostic system 12. This uniform service platform can be employed in the preferred embodiment of the invention to facilitate remote systems accessing software applications over a network. The uniform platform resides as software stored in a web server 180. Web server 180 facilitates data exchange between the diagnostic system and the service facility, and permits a series of web pages 184 and 186 to be viewed via a web browser 182. Preferably server 180 and browser 182 support HTTP applications and the browser supports Java applications. The main web page 184 is preferably a markup language page, such as an HTML page displayed for the system user on a monitor at the diagnostic system. Main web page 184 is preferably accessible from a normal operating page in which the user will configure examination requests, view the results of examinations, etc., such as via an on-screen icon. Through main web page 184, a series of additional web pages 186 are accessible. Such web pages permit service requests and requests for access to software applications to be composed and transmitted to the central service facility, and facilitate the exchange of other messages, reports, software, protocols, etc. as described more fully below. The web server 180 communicates with a network via a modem 192. A connectivity service module 188 provides for interfacing with the web server 180. A Point-to-Point Protocol (PPP) module 190 is also provided for transmitting Internet Protocol (IP) packets over remote communication connections. As will be appreciated by those skilled in the art, various other network protocols and components may be employed for facilitating data exchange over a network.

Figure 4:
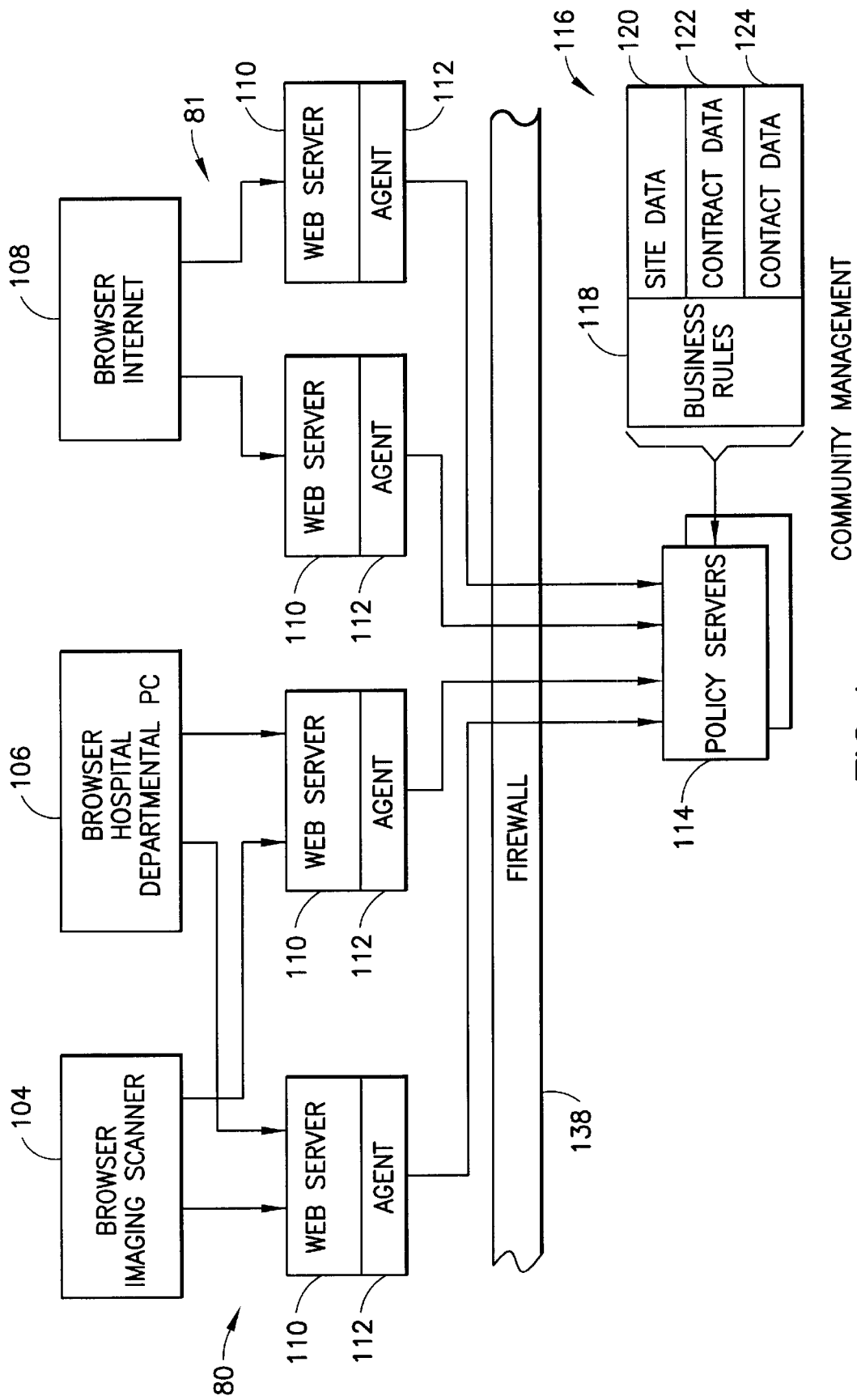
FIG. 4 is a block diagram showing portions of a community management system in accordance with the preferred embodiment of the invention.
Figure 5:
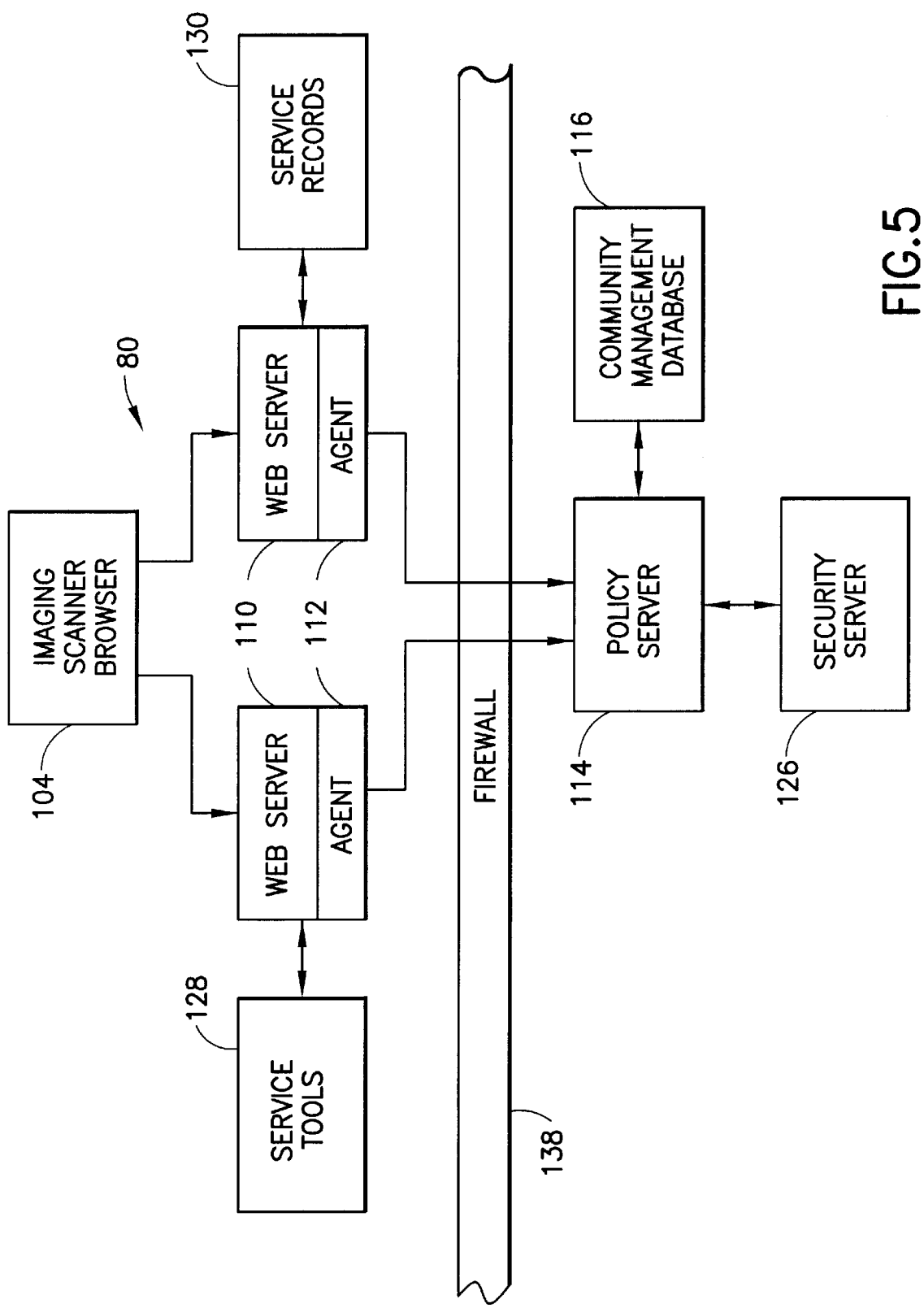
FIG. 5 is a block diagram showing portions of a system for community management of remote access with security clearance in accordance with the preferred embodiment of the invention.

A community management system may be incorporated in the service center processing system shown in FIG. 2. Alternatively, the community management system disclosed herein may be a stand-alone system. The preferred embodiments of the community management system are generally shown in FIGS. 4 and 5. In each embodiment, the system comprises a multiplicity of distributed web servers 110 which communicate with at least one policy server 114 across a firewall 138. Each web server 110 is programmed to provide access to one or more software applications, which may reside in the web server itself or may reside in respective applications servers connected to the web server 110. The web servers communicate with remote systems by means of networks. The software applications may be protected in the sense of requiring a security clearance for access or free in the sense of being openly available to anyone connected to the network. As explained in more detail hereinafter, the protected software applications in the preferred community management scheme fall into two categories: (1) those requiring a one-factor security clearance (e.g., a password) for access; and (2) those requiring a two-factor security clearance (e.g., a password and a randomly generated security code number). FIG. 4 is intended to show a portion of a community management system employing a one-factor security scheme, while FIG. 5 is intended to show a portion of a community management system employing a two-factor security scheme. FIG. 5 differs from FIG. 4 in that it additionally includes a security server 126 which communicates with the policy server 114 and which is programmed to authenticate the second factor of the two-factor security test, as will be described in greater detail later.

The remote systems accessing the web servers may comprise medical diagnostic systems, including imaging and monitoring systems. By way of example, FIG. 4 shows a browser 104 of an imaging scanner and a browser 106 of a hospital departmental personal computer, each of which can access a web server 110 via a remote access network 80, as well as a browser 108 which can access a web server 110 via the Internet 81. Each web server 110 is programmed with an agency module 112 for intercepting requests for access, determining whether the requested software is open or protected, and if protected, contacting a policy server 114. The agency module 112 provides an interface for communications between the web server 110 and the policy server 114.

The preferred embodiment further comprises a community management database 116. Generally, database 116 includes remote site data, contract or subscription data, contact or user data, and business rules (i.e., community definitions). As used herein, the term "community" refers to a group of remote system users having a particular set of access rights. As used herein, the term "software application" is intended to include software of any type, including but not limited to applications programming, configuration files, protocols, data files, worklists, service reports, service tools, system histories, system performance data, proprietary information about software used in remote medical diagnostic systems, repair techniques, business records, and so forth. The business rules stored in the community management database 116 provide the criteria for determining the software applications for which a member of a particular community has access rights. The contact or user data in the database 116 comprises user names, passwords, security codes, seed numbers, random number generation activation times, user job status or title, and other information. The contract data comprises information on the software applications which subscribing parties are entitled to access pursuant to existing contracts between remote facilities and the central service facility. The site data comprises information identifying the remote sites and the equipment used at those sites, including serial numbers of the diagnostic and imaging machines.

The preferred embodiment of the invention includes web servers 110 for providing selective access to software applications having a high-level of protection, i.e., requiring a two-factor security clearance. Software applications having this high-level security would include service-related software used by a field service engineer to repair, service, upgrade or maintain a remote diagnostic system, such as service tools 128 and service records 130 shown in FIG. 5. For example, a field service engineer employed by the central service facility can be given a two-factor security clearance which would allow remote access, e.g., via the browser 104 of a remote imaging scanner and via a network, to software applications needed for servicing that imaging scanner. The first factor is the same factor utilized in the one-factor security clearance and is authenticated by the policy server 114. In accordance with the preferred embodiment shown in FIG. 5, a security server 126 is programmed to authenticate the second factor of the two-factor security clearance under the management of the policy server 114.

Figure 6:
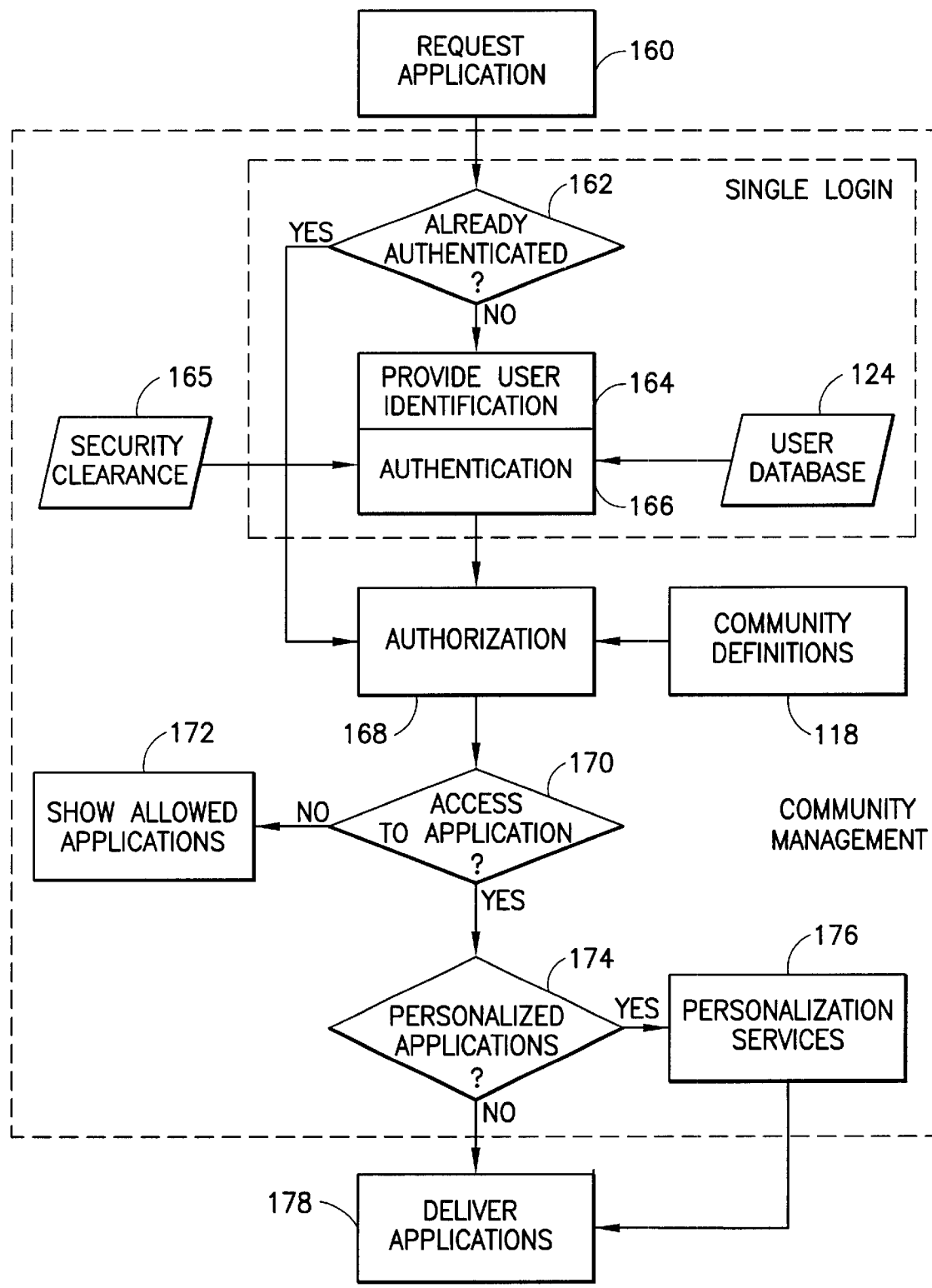
FIG. 6 is a flowchart generally depicting the secure community management process in accordance with the preferred embodiment of the invention.

The preferred method for processing security clearances is shown in FIG. 6. Each remote system is programmed with a user interface of the type shown in FIG. 3 for accessing a web server 110 via network 80, e.g., an intranet. One of the web pages 124 may be an applications web page which displays a multiplicity of virtual application selection buttons for selecting any one of a multiplicity of remotely accessible service-related (open or protected) software applications residing at the web servers 110. For the sake of discussion, it is assumed that the protected software applications residing at web servers 110 shown in FIG. 4 require a one-factor security clearance for access. In contrast, at least one of the protected software applications residing at a web server 110 shown in FIG. 5 requires a two-factor security clearance for access, thereby necessitating the presence of the security server 126. It should be further understood that some software applications may be open and not protected. However, the invention is directed primarily to the handling of remote access to protected software applications.

In response to the system user selecting a protected software application on the web browser screen, the web server 118 in the remote system sends a request to access the selected software application (step 160 in FIG. 6) to the network via blocks 126, 128 and 130 shown in FIG. 3. Preferably, the URL address of the web server 110 where the selected software application resides is hard-coded into the remote system, that URL address being automatically attached to the request for access prior to connecting to the network.

The request for access from the remote system to the addressed web server 110 is immediately intercepted by that web server's agency module 112, which first determines whether the request for access relates to an open or a protected software application. If the software application is open, i.e., available without a security clearance, then the agency module so instructs the web server and the application is delivered to the remote system. FIG. 6 represents the process for approving requests for access to protected software.

If the software application being requested requires a security clearance, the agency module then determines whether the requesting remote system user has already been authenticated (step 162 in FIG. 6), i.e., has already logged in. If the user has already logged in, then the authentication step is skipped and the policy server immediately determines if the requested access is authorized (step 168). If the requesting remote system user has not already logged in, the addressed web server downloads a window to the remote web browser which has fields for entry of the user's name, password and security code. The remote system user then enters the user identification information needed by the policy server (step 164). In the case of a user having a one-factor security clearance, the user preferably enters a user name and a password; in the case of a user having a two-factor security clearance, the user preferably enters a user name, a password, and a security code generated by a random number generator in the user's possession. The web server 118 at the remote system (see FIG. 3) then sends the inputted user information onto the network addressed to the web server 110 (see FIGS. 4 and 5) where the requested software application resides. The transmitted user information is intercepted by the agency module 112 and forwarded to the policy server 114 along with a code identifying the protected software application to which the request for access relates.

In the case of one-factor security clearances, the policy server authenticates the password (step 166) with reference to the user database 124, which forms part of the community management database. In the simplest embodiment, the user database stores a password in association with each user name, and the policy server merely retrieves that password and compare it to the password received from the agency module where the requested software resides. If the password is not authentic, the addressed web server will send an error message to the remote system. If the user code is authentic, then the policy server must next determine whether the requested access is authorized (step 168). In the case of two-factor security clearances, the policy server authenticates a password while delegating authentication of an associated security code to the security server (step 165). If the password and security code are authentic, then the policy server proceeds to the authorization stage (step 168).

In accordance with the preferred embodiment of the invention, the policy server is programmed to determine whether the remote system user is authorized to access the protected software application by performing the following steps: retrieving authorization criteria (i.e., business rules or community definitions 118) for the protected software application from the community management database; retrieving information for one or more variables (i.e., user, site, system and contract information) from the community management database; and determining whether those variables satisfy those authorization criteria. The policy server 114 reads all of the pertinent data for the identified remote system user out of the community management database and stores that retrieved data in an internal log-in cache. Based on the criteria and variable data retrieved during the authorization step 168, the policy server 114 determines whether the requesting remote system user has access rights to the requested software application (step 170).

If the requesting remote system user is authorized to access the protected software application being requested, then the policy server issues an instruction to the agency module where the protected software resides to allow access. The associated web server then download the protected software application to the remote system at, which the requesting user is logged in (step 178). As a result of downloading, the web server 118 (see FIG. 3) at the remote system displays the opening web page of the downloaded software application on the web browser 120.

Optionally, the algorithm shown in FIG. 6 includes the step 174 of determining whether the software application should be personalized prior to delivery, e.g., by including a welcome message in which the user is addressed by name. Any personalization services are performed by the web server 110 (see FIG. 4) in step 176. Then the personalized application is delivered to the remote site in step 178.

The policy server is further programmed to instruct the agency module of the web server where the requested software resides to deny access if the remote system user is a member of a community not authorized to access that protected software. Optionally, the web server where the protected software resides is programmed to deliver to the remote system a list identifying all software applications to which the requesting remote system user has access rights (step 172) in response to a denial of access by the policy server.

In accordance with one preferred embodiment, the step 162 (see FIG. 6) of determining that the user code has already been authenticated, i.e., that the remote system user has already logged in successfully, is performed as follows. The web browser at each remote system and the agency module in each applications web server have a log-in cache for storing the user inputs (e.g., user name, password and security code) and an associated authenticity tag which is generated after authentication by the policy server. The sequence of operations is as follows. (1) The remote system user transmits a request for access to a first web server. (2) The first web server then downloads a web page requesting the remote system user to log in. (3) The remote system user then enters a user name and password (one-factor security clearance) or a user, password and security code (two-factor security clearance) via the user interface and sends that inputted data to the first web server, the user information being automatically stored in a web browser log-in cache. (4) The agent of the first web server intercepts the inputted user information and sends it to the policy server. (5) If the user information is authentic, the policy server attaches an authenticity tag, stores the user information and authenticity tag in its log-in cache, and sends the same data back to the agent of the first web server. (6) That same data is then stored in the log-in cache of the agency module and sent back to the remote system, the user information and authenticity tag being stored in the web browser log-in cache. (7) When the remote system user subsequently transmits a request for access to a second web server, the user information and authenticity tag stored in the web browser log-in cache are automatically sent to that second web server. (8) The agent of the second web server then relays the received user information and authenticity tag to the policy server. (9) If the user information and authenticity tag sent by the second web server match the user information and authenticity tag stored in the log-in cache of the policy server, then the policy server sends a signal to the second web server indicating that the user code is authentic. Thus the second web server knows that it can skip the step of downloading the log-in web page to the remote system. These operations make it unnecessary for a remote system user requesting multiple software applications to log-in multiple times. Instead, a single log-in suffices no matter how many requests for access to software applications are made by a logged-in remote user.

In accordance with a further aspect of the present invention, access to software applications having a high-level of protection requires a two-factor security clearance. As previously described, the first factor is a secret password associated with a user name. The second factor is a randomly generated number which a remote system user reads from a portable device, such as a fob, which he/she carries. The portable device incorporates a random number generator for continually generating numbers in accordance with a stored random number generation algorithm and a display screen which displays the current value in the sequence of randomly generated numbers. The random number generator is activated by the central service facility starting with a seed number inputted into the portable device by the central service provider. The time of random number generation activation is then stored in the user database along with the user name, password, seed number, and other user information.

Based on the presence of a security code in the user information received from the remote system user via the agency module 112 (see FIG. 5), the policy server 114 recognizes that a two-factor security clearance must be performed. Based on the user name, the policy server 114 then retrieves the user information for that user from the community management database 116. The policy server 114 compares the inputted password to the password retrieved from the database. If they match, the policy server then sends the security code inputted by the user and the seed number and activation time for random number generation retrieved from the database to the security server 126. Based on the activation time and the seed number received from the policy server and the random number generation algorithm stored in the security server (which is the same algorithm contained in the random number generator carried by the user), the security server generates a random number for use as a reference security code. The security code inputted by the user is authenticated if it lies within a predetermined range of the reference security code. The security server then advises the policy server of the results of the comparison. If the inputted security code is authentic, the policy server then proceeds to the authorization step. If the security code is not authentic, then the policy server instructs the relevant agency module to deny access to the requested software application. The agency module may then request the remote system user to re-attempt to log-in.

Figure 7:
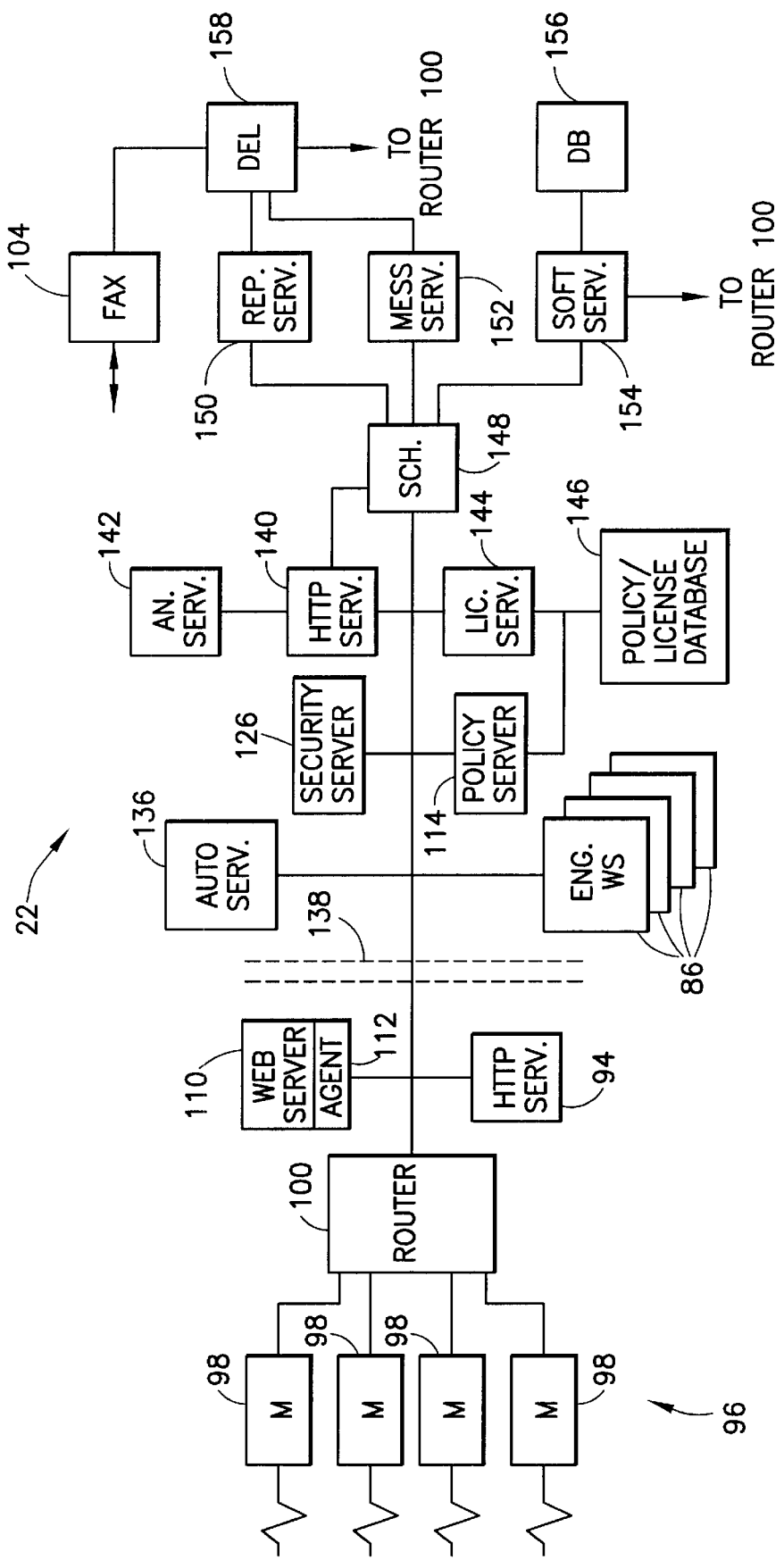
FIG. 7 is a block diagram showing a hybrid system which combines the preferred embodiment of the invention with the conventional system depicted in FIGS. 1 and 2.

FIG. 7 illustrates exemplary functional components for a service facility 22 incorporating the present invention. As indicated above, service facility 22 includes a modem rack 96 comprising a plurality of modems 98 coupled to a router 100 for coordinating data communications with the service facility. A so-called "front office" HTTP service server 94 receives and directs incoming and outgoing transactions with the facility. Preferably the applications web servers are also arranged in front of the firewall 138. Only one applications web server 110 having an agency module 112 is shown in FIG. 6. Servers 94 and 110 are coupled to the other components of the facility through a firewall 138 for system security. Operator workstations 86 are coupled to the port manager for handling service requests and transmitting messages and reports in response to such requests. An automated service unit 136 may also be included in the service facility for automatically responding to certain service requests, sweeping subscribing diagnostic systems for operational parameter data, etc. In a preferred embodiment, the automated service unit 136 may operate independently of or in conjunction with the interactive service components comprising processing system 84. It should be noted that other network or communications schemes may be provided for enabling the service facility to communicate and exchange data and messages with diagnostic systems and central service units, such as systems including outside Internet service providers and virtual private networks.

Behind firewall 138, a so-called "back office" HTTP application server 140 coordinates handling of service requests, messaging, reporting, software transfers, etc. Other servers may be coupled to HTTP application server 140, such as service analysis servers 142 configured to address specific types of service requests. In the embodiment shown in FIG. 7, processing system 84 also includes a policy server 114, a security server 126 and a license server 144. The policy server and license server are both coupled to a policy/license database 146, which would include the aforementioned community management database as well as a license database. The license module 144 performs the functions of storing, updating and verifying the status of diagnostic system service subscriptions and contracts. Alternatively, license server 144 may be placed outside of firewall 138 to verify subscription status prior to admission to the service facility. The policy server 114 performs the functions previously described herein with reference to FIGS. 4–6. The license server 144 generates licenses, installs the generated licenses on the remote systems 12 via the network 80, and logs the licenses into the policy/license database 146. The license server 144 also has the capability to remove or terminate an installed license from a remote system via the network.

Handling of service requests, messaging, and reporting is coordinated by a scheduler module 148 coupled to HTTP server 140. Scheduler module 148 coordinates activities of other servers comprising the processing system, such as a report server 150, a message server 152, and a software download server 154. As will be appreciated by those skilled in the art, servers 150, 152 and 154 are coupled to memory devices (not shown) for storing data such as task lists, addresses, log files, message and report files, applications software, etc. In particular, as illustrated in FIG. 7, software server 154 is coupled via one or more data channels to a storage device 156 for containing transmittable software packages which may be sent directly to the diagnostic systems, accessed by the diagnostic systems, or supplied on pay-per-use or purchase basis. Message and report servers 152 and 154 are further coupled, along with communications module 104, to a delivery handling module 158, which is configured to receive outgoing messages, ensure proper connectivity with diagnostic systems, and coordinate transmission of messages to the diagnostic systems and the transmission of messages and task lists to remotely located field engineers via the network.

In a preferred embodiment, the foregoing functional circuitry may be configured as hardware, firmware, or software on any appropriate computer platform. For example, the functional circuitry of the diagnostic systems may be programmed as appropriate code in a personal computer or workstation, either incorporated entirely in or added to the system scanner. The functional circuitry of the service facility may include additional personal computers or workstations, in addition to a main frame computer in which one or more of the servers, the scheduler, etc., are configured. Finally, the field service units may comprise personal computers or laptop computers of any suitable processor platform. It should also be noted that the foregoing functional circuitry may be adapted in a variety of manners for executing the functions described herein. In general, the functional circuitry facilitates the exchange of service data between the diagnostic systems and a central service facility, which is preferably implemented in an interactive manner to provide regular updates to the diagnostic systems of service activities.

Although the disclosed preferred embodiment employs modems to facilitate communications with a remote access network, it should be appreciated that modems are not necessary to practice of the invention. In particular, the internet or private networks can be used.

While the invention has been described with reference to preferred embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention, but that the invention will include all embodiments falling within the scope of the appended claims.

As used in the claims, the term "software application" is intended to include software of any type, including but not limited to applications programming, configuration files, protocols, data files, worklists, service reports, system histories, service tools, system performance data, proprietary documents, repair techniques, business records, and so forth.

What is claimed is:

1. A method for allowing access to a protected software application by a remote system user via a network, comprising the steps of:

storing a community management database at a central facility, said community management database comprising, for each one of a plurality of protected software applications, a respective rule for defining a community of members entitled to access the respective protected software application, and further comprising information for a plurality of variables, each variable of said plurality belonging to one of the following categories: remote system information variables, remote system site variables, remote system variables, and remote system contract variables, each of said rules being a function of one or more of said variables;

said remote system user sending a request for access to a particular protected software application, said request being sent to a server that can provide access to said particular protected software application via said network;

said remote system user sending a user identification and a password to said server via said network;

said server in turn sending said user identification and said password to said central facility;

said central facility determining whether said password is authentic;

said central facility determining whether said remote system user is authorized to access said particular protected software application; and allowing said remote system user to access said particular protected software application if a number of conditions are met, said conditions including at least the following: said password is authentic and said remote system user is authorized to access said particular protected software application, wherein said step of determining whether said remote system user is authorized comprises the following steps:

retrieving a particular rule corresponding to said particular protected software application from said community management database;

retrieving information for one or more variables from said community management database, said information being related to said user identification; and determining whether said retrieved variable information satisfies said retrieved rule, access being not authorized if said retrieved variable information does not satisfy said retrieved rule.

2. The method as recited in claim 1, wherein said central facility authenticates said password sent by said remote system user by matching said password with a password retrieved from said community management database.

3. The method as recited in claim 1, wherein said community management database stores passwords for each person authorized to access software applications from said remote medical diagnostic system via said network.

4. The method as recited in claim 1, wherein said remote system user sends said request for access and user identification data by interacting with a web browser at said remote medical diagnostic system.

5. A system comprising:
a network;
a web server connected to said network and comprising an agency module programmed to enable access to a particular protected software application in response to an authorization;
a remote system having a web browser for sending to said web server via said network a request for access to said particular protected software application, a user identification, and a password;
a community management database comprising, for each one of a plurality of protected software applications, a respective rule for defining a community of members entitled to access the respective protected software application, and further comprising information for a plurality of variables, each variable of said plurality belonging to one of the following categories: remote system information variables, remote system site variables, remote system variables, and remote system contract variables, each of said rules being a function of one or more of said variables; and
a policy server which communicates with said community management database and with said agency module, said policy server being programmed to perform the following steps:
determining whether said password is authentic;
determining whether said remote system user is authorized to access said particular protected software application; and
sending said authorization to said agency module if a number of conditions are met, said conditions including at least the following: said password is authentic and said remote system user is authorized to access said particular protected software application,
wherein said step of determining whether said remote system user is authorized comprises the following steps:
retrieving a particular rule corresponding to said particular protected software application from said community management database;
retrieving information for one or more variables from said community management database, said information being related to said user identification; and
determining whether said retrieved variable information satisfies said retrieved rule, access being not authorized if said retrieved variable information does not satisfy said retrieved rule.

6. The system as recited in claim 5, wherein said step of determining whether said password is authentic comprises the following steps:
receiving said request for access, said user identification, and said password from said agency module;
retrieving from said community management database a password with said received user identification; and
determining whether said retrieved password matches said received password.

7. The system as recited in claim 5, further comprising a firewall between said web server and said policy server.

8. A method for providing software applications to a multiplicity of remote systems via networks, comprising the steps of:
constructing an electronically accessible community management database comprising information sufficient for a processor to determine whether a particular system user identified by a user code in said database belongs to a community having access rights to a particular software application identified by an application code in said database;
detecting the application code of a first software application being requested by a particular remote system user;
receiving the user code of said particular remote system user via a network;
checking said community management database to determine whether said particular remote system user is a member of a community having access rights to said first software application;
denying said particular remote system user access to said first software application if said particular remote system user is not a member of a community having access rights to said first software application;
checking said community management database to determine whether said user code is authentic;
granting said particular remote system user access to said first software application if said user code is authentic and if said particular remote system user is a member of a community having access rights to said first software application;
storing in said remote system a first network address whereat said first software application can be accessed;
requesting access to said first software application by interacting with a web browser at said remote system; and
addressing said request for access to said first network address.

9. The method as recited in claim 8, further comprising the steps of:
sending a log-in request to said web browser in response to receipt of said request for access at said first network address;
logging in by inputting said user code via said web browser;
storing said user code in a log-in cache in said web browser; and
sending said user code to said first network address in response to said log-in.

10. The method as recited in claim 9, further comprising the steps of:
storing in said remote system a second network address whereat a second software application can be accessed;
checking said community management database to determine whether said user code is authentic;
if said user code is authentic, delivering an authenticity tag to said remote system for storage in said log-in cache in said web browser;
requesting access to said second software application by interacting with said web browser; and
automatically sending said user code and said authenticity tag to said second network address along with said request for access to said second software application.

11. The method as recited in claim 8, further comprising the step of sending a list of software applications to said web browser if said particular remote system user is not a member of a community having access rights to said first software application, said list identifying all software applications to which said particular remote system user has access rights.

12. The method as recited in claim 8, further comprising the steps of:
- personalizing said first software application if said particular remote system user is granted access; and
- delivering said personalized first software application to said web browser.

13. A system comprising:
- a community management database comprising a set of application codes for identifying protected software applications, a respective rule for each one of said protected software applications for defining a community of members entitled to access the respective protected software application, and information for a plurality of variables, each variable of said plurality belonging to one of the following categories: remote system information variables, remote system site variables, remote system variables, and remote system contract variables, each of said rules being a function of one or more of said variables; and
- a policy server programmed to perform the following steps:
  - receiving a user code of a requesting remote system user;
  - detecting an application code of a first protected software application being requested by said requesting remote system user;
  - accessing said community management database to determine whether said requesting remote system user belongs to a community having access rights to said first protected software application; and
  - issuing a signal representing authorization if a number of conditions are met, said conditions including at least the following: said user code is authentic and said remote system user is authorized to access said first protected software application,
- wherein said step of determining whether said remote system user is authorized comprises the following steps:
  - retrieving a particular rule corresponding to said first protected software application from said community management database;
  - retrieving information for one or more variables from said community management database, said information being related to said user code; and
  - determining whether said retrieved variable information satisfies said retrieved rule, access being not authorized if said retrieved variable information does not satisfy said retrieved rule.

14. The system as recited in claim 13, further comprising:
- a network;
- a first web server accessible via said network and programmed to provide selective access to said first protected software application; and
- a remote system comprising means for accessing said first web server via said network, means for requesting access to said first protected software application, and means for logging in said user code of said requesting remote system user,
- wherein said policy server is programmed to issue a signal representing an instruction to said first web server to grant access to said first protected software application if said user code is authentic and said remote system user has access rights to said requested first protected software application, and said first web server is programmed to deliver said requested first protected software application to said remote system in response to said instruction to grant access.

15. The system as recited in claim 14, wherein said policy server is programmed to issue a signal representing an instruction to said first web server to deny access to said first protected software application if said remote system user does not have access rights to said first protected software application, and said first web server is programmed to deliver a list of allowed applications to said remote system in response to said instruction to deny access.

16. The system as recited in claim 14, wherein said first web server is programmed with an agency module for handling communications with said policy server.

17. The system as recited in claim 16, wherein said requesting means and said logging-in means of said remote system are incorporated in a web browser, and wherein each of said web browser, said agency module and said policy server comprise a respective log-in cache, and said policy server is programmed to generate an authenticity tag in response to authentication of said user code, said authenticity tag being stored in each of said log-in caches along with said user code.

18. The system as recited in claim 17, further comprising a second web server accessible via said network, programmed to allow selective access to a second protected software application, and comprising a log-in cache, wherein said remote system comprises means for automatically sending said user code and said authenticity tag to said second web server along with said request for access to said second protected software application, said second web server being further programmed to send said user code and said authenticity tag to said policy server, and said policy server being further programmed to verify said user code and said authenticity tag received from said second web server.

19. The system as recited in claim 14, wherein said means for accessing said first web server via said network comprises a network address hard-coded in said remote system.

20. The system as recited in claim 14, further comprising a firewall between said first web server and said policy server.

21. A system comprising:
- a network;
- a web server accessible via said network and programmed to provide selective access to a protected software application;
- a remote system comprising means for accessing said web server via said network, means for requesting access to said protected software application, and means for logging in a user code of a remote system user requesting access to said protected software application;
- a community management database comprising a set of business rules for defining communities of remote system users, a set of user codes for identifying remote system users, and a set of application codes for identifying protected software applications to which various communities of remote system users have access rights; and
- a policy server programmed to perform the following steps:
  - receiving said user code of said requesting remote system user;

detecting an application code of said protected software application being requested by said requesting remote system user;

accessing said community management database to determine whether said requesting remote system user belongs to a community having access rights to said requested protected software application; and issuing a signal representing the results of said determination, wherein said policy server is programmed to issue a signal representing an instruction to said web server to grant access to said protected software application if said user code is authentic and said remote system user has access rights to said protected software application, and said web server is programmed to perform the steps of:

personalizing said software application if said requesting remote system user is granted access; and delivering said personalized software application to said remote system.

22. A system comprising:

a network;

first and second web servers accessible via said network and programmed to provide selective access to first and second protected software applications, respectively;

a remote system comprising a web browser for requesting access to said first and second protected software applications and logging in a user code of a remote system user, a community management database comprising, for each of said first and second protected software applications, a respective rule for defining a community of members entitled to access the respective protected software application, and further comprising information for a plurality of variables, each variable of said plurality belonging to one of the following categories: remote system information variables, remote system site variables, remote system variables, and remote system contract variables, each of said rules being a function of one or more of said variables; and a computer programmed to manage access to either of said first and second protected software applications by said remote system user in accordance with said respective rule in said community management database by applying said respective rule to variable information associated with said user code in said community management database.

23. The system as recited in claim 22, wherein said computer is programmed to issue a signal representing an instruction to said web server to grant access to a requested one of said first and second protected software applications if said remote system user is a member of a community having access rights to said requested one of said first and second protected software applications.

24. The system as recited in claim 22, wherein said computer is programmed to issue a signal representing an instruction to said web server to deny access to a requested one of said first and second protected software applications if said remote system user is not a member of a community having access rights to said requested one of said first and second protected software applications.

25. The system as recited in claim 22, further comprising a firewall between said first and second web servers and said computer.

26. The system as recited in claim 22, wherein said remote system comprises a medical diagnostic system, said first protected software application comprises records of service provided to said medical diagnostic system that are accessible to a community of authorized service personnel and not accessible to a community that includes persons not authorized to service said medical diagnostic system.

27. The system as recited in claim 22, wherein said remote system comprises a medical diagnostic system, said first protected software application comprises tools used in servicing said medical diagnostic system that are accessible to a community of authorized service personnel and not accessible to a community that includes persons not authorized to service said medical diagnostic system.

* * * * *